United States Patent
Mukherjee

(10) Patent No.: US 7,649,845 B2
(45) Date of Patent: Jan. 19, 2010

(54) HANDLING HOT SPOTS IN INTERCONNECTION NETWORKS

(75) Inventor: Shubhendu S. Mukherjee, Framingham, MA (US)

(73) Assignee: Intel Corporation, Santa Clara, CA (US)

( * ) Notice: Subject to any disclaimer, the term of this patent is extended or adjusted under 35 U.S.C. 154(b) by 853 days.

(21) Appl. No.: 11/241,329

(22) Filed: Sep. 30, 2005

(65) Prior Publication Data

US 2007/0076622 A1    Apr. 5, 2007

(51) Int. Cl.
*H04L 12/56* (2006.01)
(52) U.S. Cl. ...................................... 370/235
(58) Field of Classification Search .................. None
See application file for complete search history.

(56) References Cited

U.S. PATENT DOCUMENTS

| | | | | |
|---|---|---|---|---|
| 5,936,940 | A * | 8/1999 | Marin et al. | 370/232 |
| 6,009,488 | A | 12/1999 | Kavipurapu | 710/105 |
| 6,216,163 | B1 * | 4/2001 | Bharali et al. | 709/227 |
| 6,700,876 | B1 * | 3/2004 | DiNicola et al. | 370/252 |
| 7,242,306 | B2 * | 7/2007 | Wildman et al. | 340/573.1 |
| 7,492,720 | B2 * | 2/2009 | Pruthi et al. | 370/252 |
| 2005/0030952 | A1 * | 2/2005 | Elmasry et al. | 370/395.2 |

OTHER PUBLICATIONS

Shubhendu S. Mukherjee, Peter Bannon, Steven Lang, Aaron Spink, and David Webb, "The Alpha 21364 Network Architecture," IEEE Micro, pp. 26-35, vol. 22, No. 1, Jan./Feb. 2002.

Shubhendu S. Mukherjee, Federico Silla, Peter Bannon, Joel Emer, Steve Lang, and David Webb, "A Comparative Study of Arbitration Algorithms for the Alpha 21364 Pipelined Router," Tenth Annual International Symposium on Architectural Support for Programming Languages and Operating Systems, San Jose, Oct. 2002. Also, appears in the First Intel Microarchiteture Conference, Oregon, May 2002.

Mithuna Thottethodi, Alvin Lebeck, and Shubhendu S. Mukherjee, "High-Performance Routing Algorithms for Virtual Cut-Through Networks," International Parallel and Distribtued Processing Symposium (IPDPS), Apr. 2003.

Mithuna Thottethodi, Alvin Lebeck, and Shubhendu S. Mukherjee, "Self-Tuned Congestion Control for Multiprocessor Networks," International Symposium on High-Performance Computer Architecture (HPCA), Jan. 2001.

* cited by examiner

*Primary Examiner*—Anh-Vu Ly
(74) *Attorney, Agent, or Firm*—Trop, Pruner & Hu, P.C.

(57) ABSTRACT

A network may include an interconnection system which allows packets to transit from various sources to various destinations under control of routers. The routers may determine a transit time of packet transit from various sources to a given destination. This information may be used to detect a hot spot within the network. Other embodiments are described and claimed.

27 Claims, 7 Drawing Sheets

HANDLING HOT SPOTS IN INTERCONNECTION NETWORKS

BACKGROUND

Embodiments of the present invention relate generally to improving performance of interconnection networks.

Many different systems use interconnection networks to provide for communication between system components. Accordingly, interconnection networks allow communications between processors and memory modules. Interconnection networks may be used in diverse system types including large-scale shared-memory multiprocessors and clusters of loosely-coupled workstations. In some interconnection networks, communications may be encapsulated in network packets and delivered to destination processors or memories.

Many multiprocessor systems include numerous processors and large cache-coherent shared-memory. For example, some server machines have 32 or more processors and include an interconnection network to connect these processors to memory modules within the system. To operate in a desired fashion, these systems should provide for low latency and high bandwidth communication via their interconnection networks. Network packets transmitted via an interconnection network include various information. For example, processor cache misses, software messages to a remote memory module, another processor's cache, or another processor and consequent responses may occur in a given system. However, these packets can be delayed as a result of network congestion such as transient network congestion. The performance of parallel applications, such as database servers, depends on how rapidly and how many of these requests and responses can be processed.

Some networks may exhibit a phenomenon called a hot spot. A hot spot is an area of congestion in which communications are delayed. Hot spots may be detrimental to the performance of the network. Hot spots build up due to congestion at specific localized areas of a network. The generation of a hot spot may, over time, lead to tree saturation when the effect of the congestion propagates through different regions of the network.

Some systems employ different algorithms to provide for congestion control. Such algorithms typically fall into one of two categories, either acting to throttle a source to avoid injecting more traffic or routing packets around the congestion. However, these congestion control algorithms do not detect development of hot spots at locations remote to the hot spot itself. Accordingly, when hot spots arise, it is difficult to detect how the hot spot is developing in a node which is far away from a source node. Thus, the source node may continue to send messages which can further increase congestion at the hot spot. While eventually back pressure in the network may propagate to a source node targeting messages for the hot spot region, that back pressure may take so long to arrive at the source node that performance of the network may already by severely degraded.

A need thus exist for improved handling of hot spots.

DETAILED DESCRIPTION

In various embodiments, hot spot detection may be performed to determine the location of one or more hot spots in a network. Hot spots may be detected at locations far away (i.e., globally) from where the hot spot detection is performed (i.e., locally). In such manner, hot spots may be detected early, oftentimes prior to development of a full-blown hot spot. In other words, a network entity may contemplate an imminent hot spot within a particular region, and provide information to other entities to route messages to avoid the imminent or current hot spot.

In different embodiments, different manners of detecting hot spots may be employed. Furthermore, hot spot detection methods may be adapted to different types of interconnection networks of different network topologies, such as a torus or other multiprocessor cache-coherent system. In other embodiments, point-to-point interconnect systems may perform hot spot detection.

Figure 1:
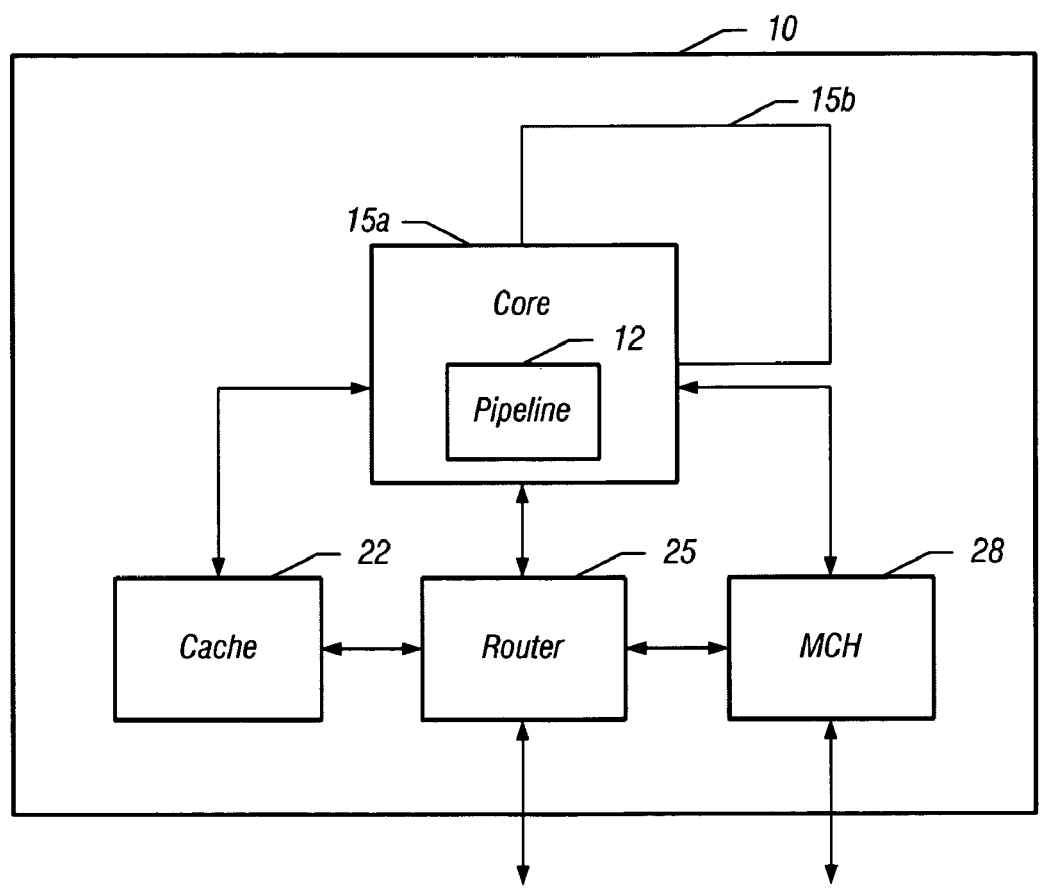
FIG. 1 is a block diagram of a processor in accordance with one embodiment of the present invention.

Referring now to FIG. 1, shown is a block diagram of a processor 10 in accordance with one embodiment of the present invention. As shown in FIG. 1, processor 10 may be a multi-core processor, each core of which may include a multi-stage pipeline 12. As shown in FIG. 1, processor 10 may include multiple cores, including a first core 15a and a second core 15b. While shown in FIG. 1 with only two cores, it is to be understood that the scope of the present invention is not so limited and embodiments having many more than two cores, such as a mini-core architecture are also contemplated. In other embodiments, a processor having the general architecture of processor 10 may be a single core processor.

As further shown in FIG. 1, each core of processor 10 may be coupled to a cache memory 22, a router 25, and a memory controller hub (MCH) 28. Furthermore, cache memory 22 and router 25 may be coupled together and similarly, router 25 and MCH 28 may be coupled together. Cache memory 22 may be used to provide relatively fast and temporary storage of instructions and data used by the various processor cores. Router 25 may be used to couple processor 10 to other nodes of an interconnection network, as will be described further below. MCH 28 may be used to interface processor 10 with an associated memory, such as a shared memory, for example, a portion of a shared memory locally coupled to processor 10. While shown with this particular architecture in the embodiment of FIG. 1, other processor architectures may be implemented in other embodiments.

In different embodiments, multi-stage pipeline 12 may include a different number of stages to handle various functions such as prefetching of instructions from a memory, decoding the instructions, executing the instructions, and writing back result data. While described with regard to FIG. 1 as a relatively straightforward pipeline, it is to be understood the scope of the present invention is not so limited, and embodiments may be used with many different kinds of processors having many more stages and functionality, including, for example, in-order processors, out-of-order processors, scalar, superscalar and vector processors, among many others.

As described above, hot spot detection in accordance with different embodiments of the present invention may be used in many different network topologies. For example, networks may take the form of a K-ary N-cube network, where K corresponds to the number of dimensions in the network and N corresponds to the number of nodes per dimension. As specific examples, a two-dimensional (2D) torus network or 3D or 4D torus networks may take advantage of embodiments of the present invention. Furthermore, other embodiments may be used in connection with irregular network topologies in which local routers include tables that identify the nodes of the network, along with source-destination thresholds. Still further, embodiments may be used in connection with a fat tree network. In yet other embodiments, hot spot detection may be performed in a mini-core-based system in which a plurality of mini-cores are coupled in a given network topology, as a 1D torus, a 2D torus or a 3D torus, for example.

Figure 2:
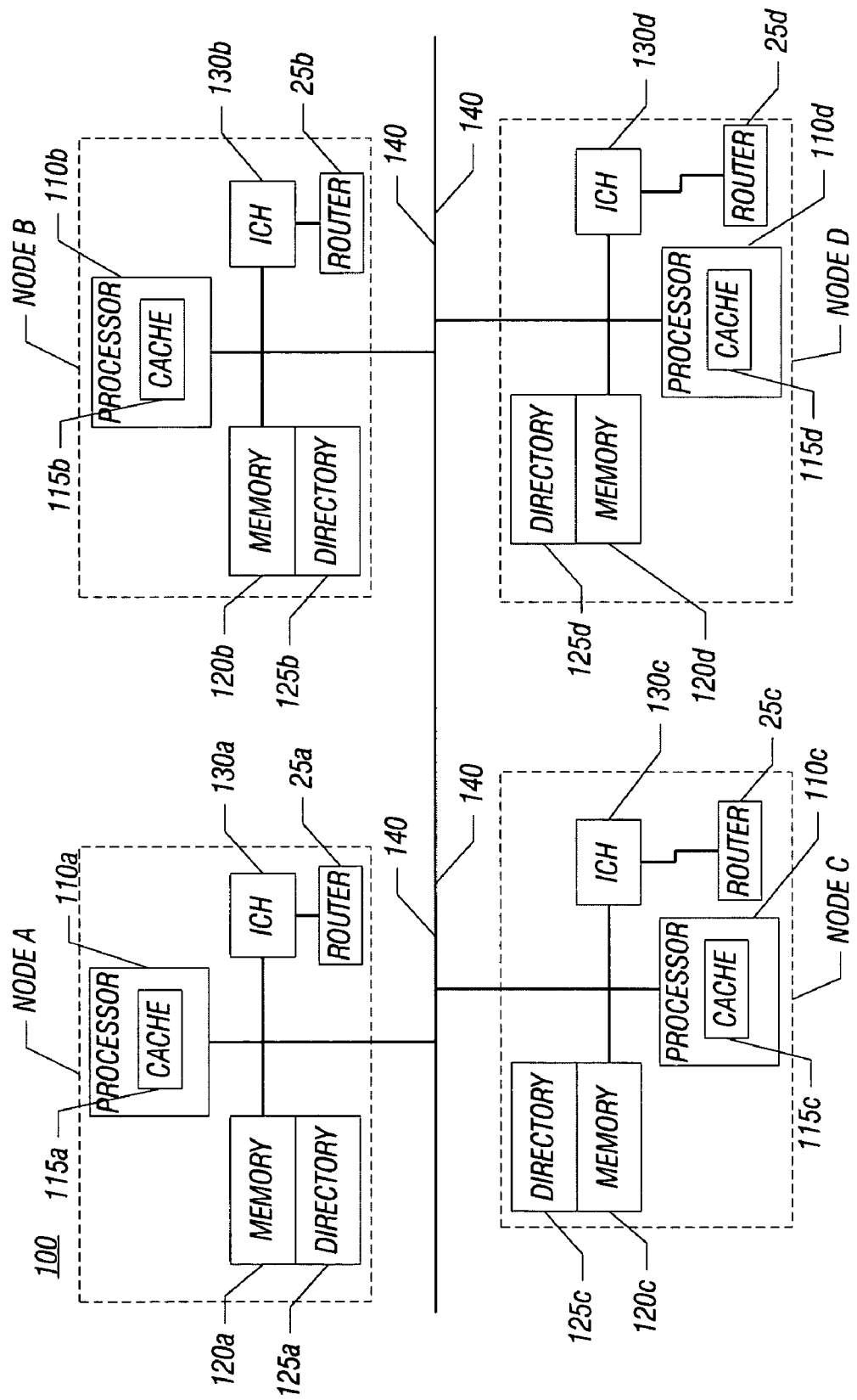
FIG. 2 is a block diagram of a multiprocessor network in accordance with one embodiment of the present invention.

Referring now to FIG. 2, shown is a network forming a multiprocessor system 100 including a plurality of nodes A-D each including one of a plurality of processor cores 110a-d (generically, processor 110). While this embodiment includes four processor cores, it is to be understood that additional (and potentially many more) such processors may be present in a given system.

A processor 110 may have an internal cache hierarchy 115a-d (generically, cache 115) which may be one or more cache memories associated with a corresponding processor. Furthermore, a portion of main memory 120a-d (generically, memory 120), which may be a dynamic random access memory (DRAM), is coupled to each processor 110 locally.

Each node may also include an input/output (I/O) controller hub (ICH) 130a-d (generically, ICH 130) that may be used to couple a given node to various input/output or other peripheral devices. The nodes may be coupled together via an interconnect 140, which may be a high-speed bus to enable communications between the different nodes. As shown in FIG. 2, the nodes B, C, and D may have corresponding circuitry to that discussed above regarding node A, although different components may be present in other embodiments.

As further shown in FIG. 2, each node includes a router 25a-d (generically, router 25) that may control internode communications and may further perform hot spot detection. These routers 25 may be used to perform hot spot detection according to a distributed model. That is, each router 25 may include a table for storing source-destination (e.g., node-to-node) threshold information. Furthermore, each router 25 may perform hot spot detection to determine whether packets received from one or more sources exceed their threshold times. If so, the local router can determine a location of the hot spot using, for example, triangulation methods.

Upon detection of one or more such hot spots, different algorithms may be employed to control packet routing with respect to the hot spot. For example, a router detecting a hot spot may send an indication of the hot spot location to other routers within the network. In some embodiments, a router may send hot spot information as part of a response packet sent back to a source that previously sent a request packet. Alternately, dedicated hot spot indication packets may be sent to other routers.

Based on the hot spot information, one or more of the distributed routers 25 may resolve the hot spot using various methods. For example, packets from one or more sources may be throttled until the hot spot is resolved. Alternately, an adaptive routing algorithm may be used to route packets around a hot spot. For example, packets may be sent through a via between a source and destination to provide a different minimum rectangle (as described below) through which to send packets.

Figure 3:
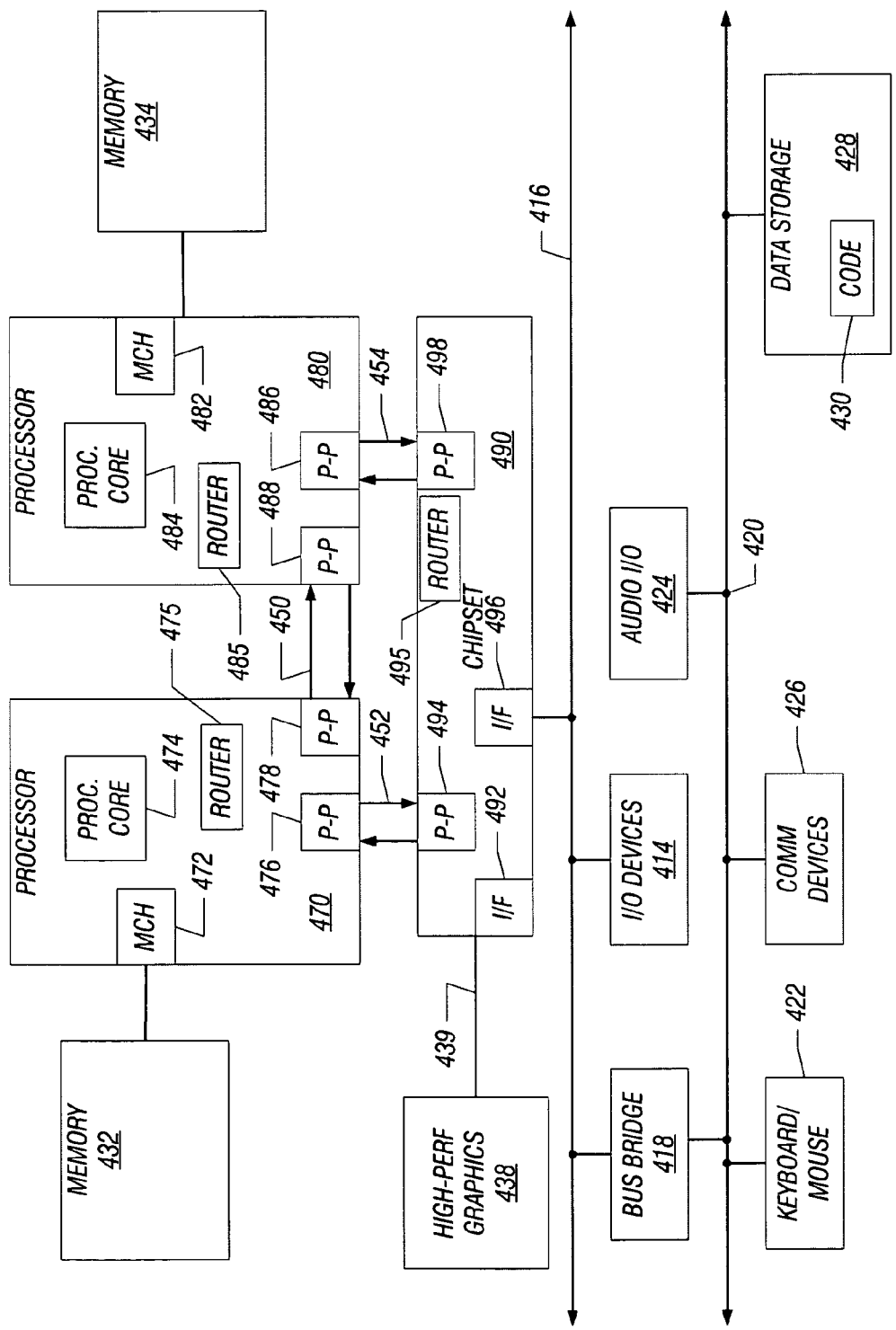
FIG. 3 is a block diagram of a point-to-point multiprocessor system in accordance with another embodiment of the present invention.

While FIG. 2 is one particular configuration, other embodiments of a multiprocessor system may be configured differently. For example, in some embodiments nodes may be coupled together in a point-to-point configuration. As shown in FIG. 3, a multiprocessor system may also be a point-to-point (P-P) interconnect system that includes a first processor 470 and a second processor 480 coupled via a point-to-point interconnect 450. First processor 470 may include a processor core 474, a memory controller hub (MCH) 472 and point-to-point (P-P) interfaces 476 and 478. Of course, multiple cores may be present within processor 470.

As further shown in FIG. 3, processor 470 includes a router 475, which may perform packet routing and hot spot detection in accordance with an embodiment of the present invention. Similarly, second processor 480 may include the same components, namely a processor core 484, a MCH 482, P-P interfaces 486 and 488, and a router 485. As shown in FIG. 3, MCH's 472 and 482 may couple the processors to respective memories, namely a memory 432 and a memory 434, which may be portions of main memory locally attached to the respective processors.

First processor 470 and second processor 480 may be coupled to a chipset 490 via P-P interconnects 452 and 454, respectively. As shown in FIG. 3, chipset 490 includes P-P interfaces 494 and 498, and a router 495. Furthermore, chipset 490 includes an interface 492 to couple chipset 490 with a high performance graphics engine 438. In one embodiment, an Advanced Graphics Port (AGP) bus 439 may be used to couple graphics engine 438 to chipset 490. AGP bus 439 may conform to the Accelerated Graphics Port Interface Specification, Revision 2.0, published May 4, 1998, by Intel Corporation, Santa Clara, Calif. Alternately, a point-to-point interconnect 439 may couple these components.

In turn, chipset 490 may be coupled to a first bus 416 via an interface 496. In one embodiment, first bus 416 may be a Peripheral Component Interconnect (PCI) bus, as defined by the PCI Local Bus Specification, Production Version, Revision 2.1, dated June 1995 or a bus such as the PCI Express bus or another third generation I/O interconnect bus, although the scope of the present invention is not so limited.

As shown in FIG. 3, various I/O devices 414 may be coupled to first bus 416, along with a bus bridge 418 which couples first bus 416 to a second bus 420. In one embodiment, second bus 420 may be a low pin count (LPC) bus. Various devices may be coupled to second bus 420 including, for example, a keyboard/mouse 422, communication devices 426 and a data storage unit 428 which may include code 430, in one embodiment. Further, an audio I/O 424 may be coupled to second bus 420.

Thus in FIG. 3, each agent shown includes a router for performing distributed routing functions, including hot spot detection. The hot spot detection may be used to locally identify congestion occurring at a location remote from the local agent. That is, while shown with only two processors and a single chipset for ease of illustration, a typical point-to-point interconnect system may include many more processors and other agents. In such a system, distributed routers may be present within each processor of the system, as well as within other network agents, such as input/output hubs, bridging agents, and other chipsets.

Thus many different interconnection networks in accordance with various embodiments of the present invention include routers to handle routing of packets arriving at input ports of the routers to appropriate output ports of the routers. Such routers may include one or more algorithms to perform hot spot detection in accordance with an embodiment of the present invention, along with other arbitration and routing algorithms.

Figure 4:
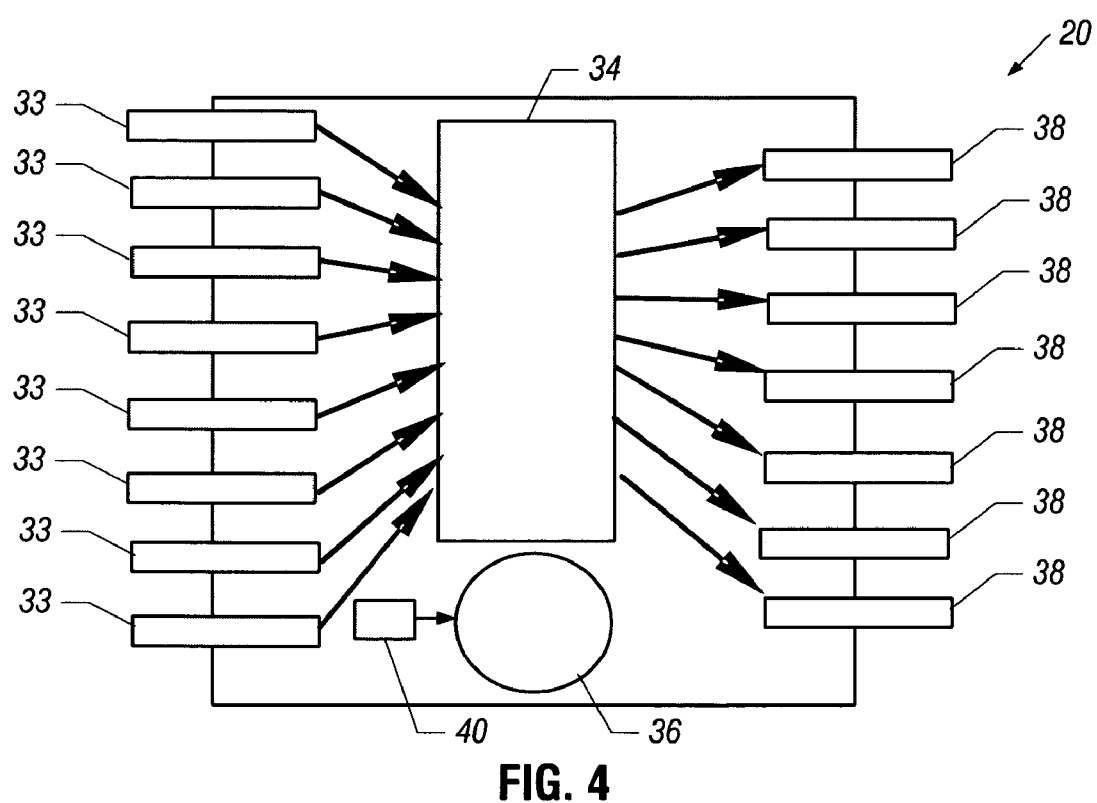
FIG. 4 is a network router in accordance with one embodiment of the present invention.

One example of a router 20 in accordance with one embodiment of the present invention is shown in FIG. 4. Router 20 may correspond to router 25 of processor 10 in FIG. 1 or routers 25 in the nodes of FIG. 2, or the routers in the agents of FIG. 3, for example. Router 20 may include a plurality of input ports 33 selectively coupled through a crossbar switch 34 to a plurality of output ports 38. An arbiter 36 may control the connections between input ports 33 and output ports 38. Arbiter 36 may further resolve conflicting resource demands. Router 20, in one embodiment, may be controlled by software including software 40. While not shown in FIG. 4, it is to be understood that router 20 may further include one or more input buffers to receive incoming packets. These buffer(s) may be coupled to input ports 33. As will be described further below, software 40 and arbiter 36 may further perform hot spot detection and perform thresholding, windowing, and time stamping functions.

Figure 5:
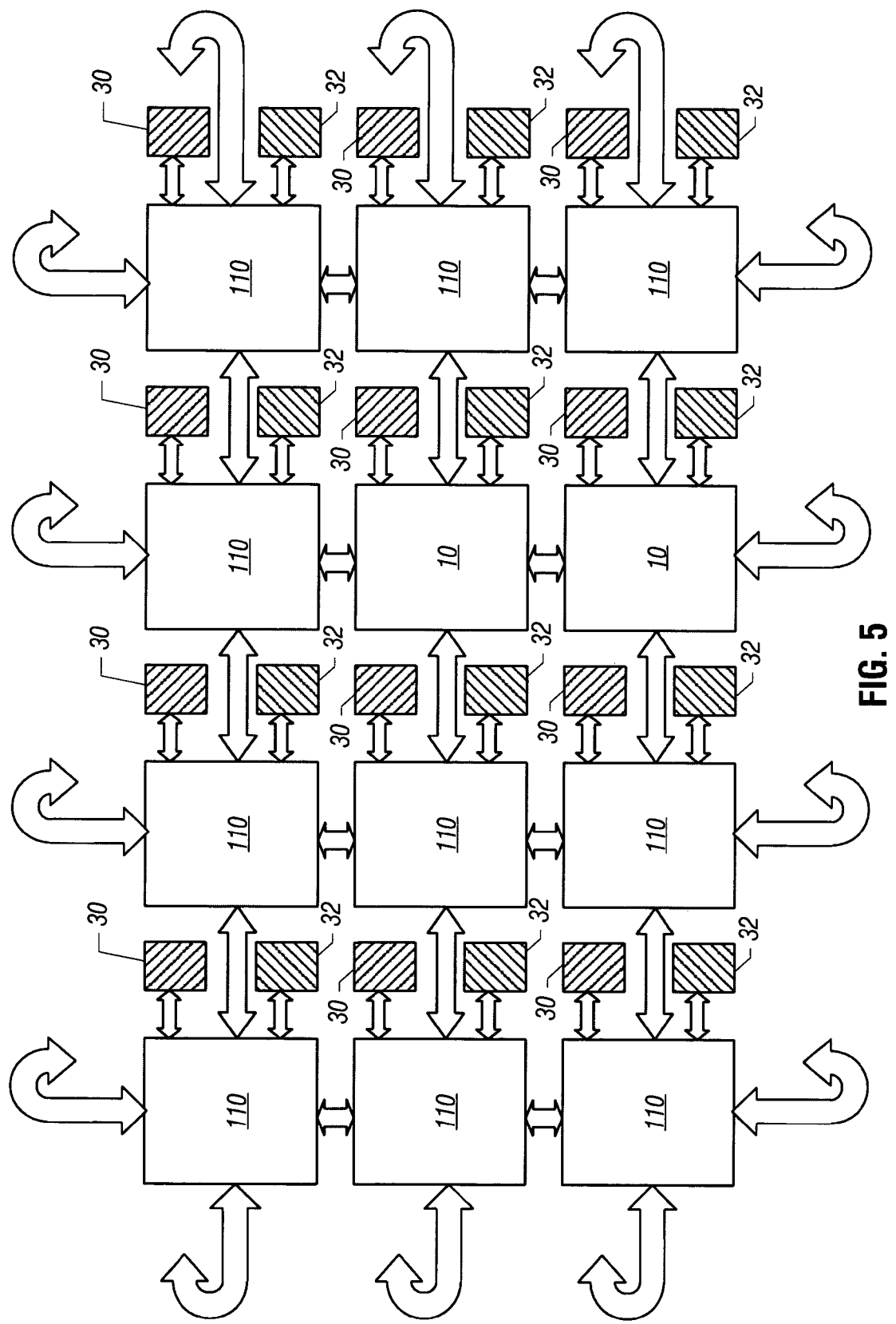
FIG. 5 is an interconnection network of processors and routers in accordance with one embodiment of the present invention.

Referring now to FIG. 5, a network may include a number of processors 110, each coupled to a memory 30 and an input/output (I/O) interface 32. In one embodiment, each processor 110 may correspond to processor 10 described above with regard to FIG. 1. In still other embodiments, these complexes of processor, memory and I/O interface that form the network may correspond to the nodes of a multiprocessor system as depicted in FIG. 2, the agents of a point-to-point system shown in FIG. 3 or the components of any one processor-based system or any two or more networked systems including those systems that communicate with or without wires.

The network arrangement shown in FIG. 5 may be considered a 2D torus network. Packets are routed from a source to destination within a minimum rectangle formed by the source and destination. More specifically, given two points in a torus, one can draw four rectangles that contain these two points as their diagonally opposite vertices. The minimum rectangle is the rectangle formed having a minimum diagonal distance between source and destination.

Figure 6A:
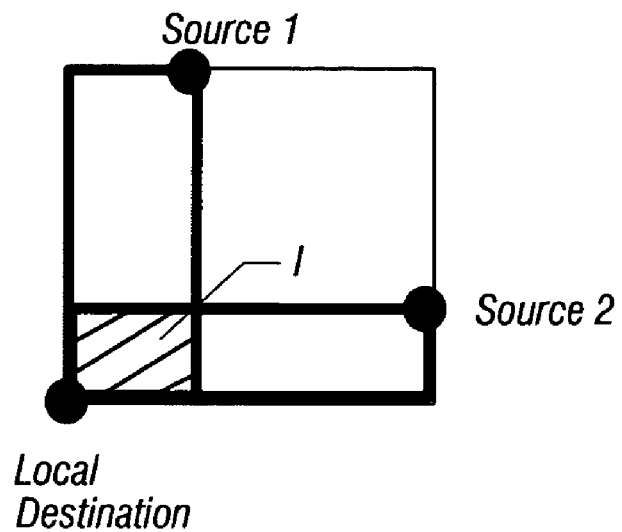
FIG. 6A is a depiction of hot spot detection.
Figure 6B:
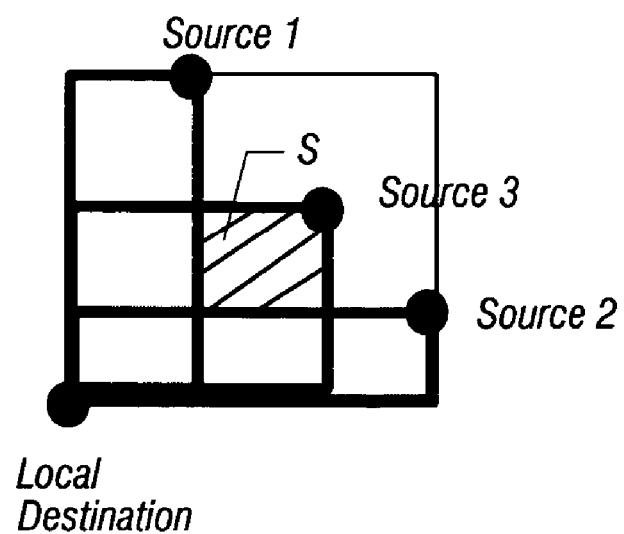
FIG. 6B is another depiction of hot spot detection.

Referring to FIGS. 6A and 6B, location of a hot spot in a 2D torus or 2D mesh is illustrated. The shaded regions are hot spots. In FIG. 6A, both the source 1 to local destination and the source 2 to local destination communications indicate hot spots within their minimum rectangles. The sources may be at remote locations to the local destination, which includes a router. The hot spot may be indicated by an unusually high source-to-destination latency. Consequently, the intersection I corresponding to the shaded region has a high likelihood of being the hot spot location.

In FIG. 6B, the source 1 to local destination and the source 2 to local destination transits do not indicate any hot spot within their minimum rectangles, but the communication from source 3 to the local destination does indicate a hot spot. Thus, the shaded region S in FIG. 6B has a strong likelihood of being the hot spot location. Using transit time information from these packets from multiple sources, a router of the local destination can determine both existence of a hot spot as well as its location using, for example, a triangulation method.

In one embodiment of the present invention, time-stamped packets may be sent from the source to the destination. If those packets arrive at the destination after an excessive delay (as determined with reference to the time stamp), a hot spot may be emerging or present in the packet transmission path. The location of the hot spot may be determined by sending packets from a number of sources to a destination and determining which of those paths from source to destination result in excessive delay. Excessive delay may be gauged relative to a threshold which, in turn, may be determined based on network characteristics, desired system operating speed or the like, in various embodiments.

Figure 7:
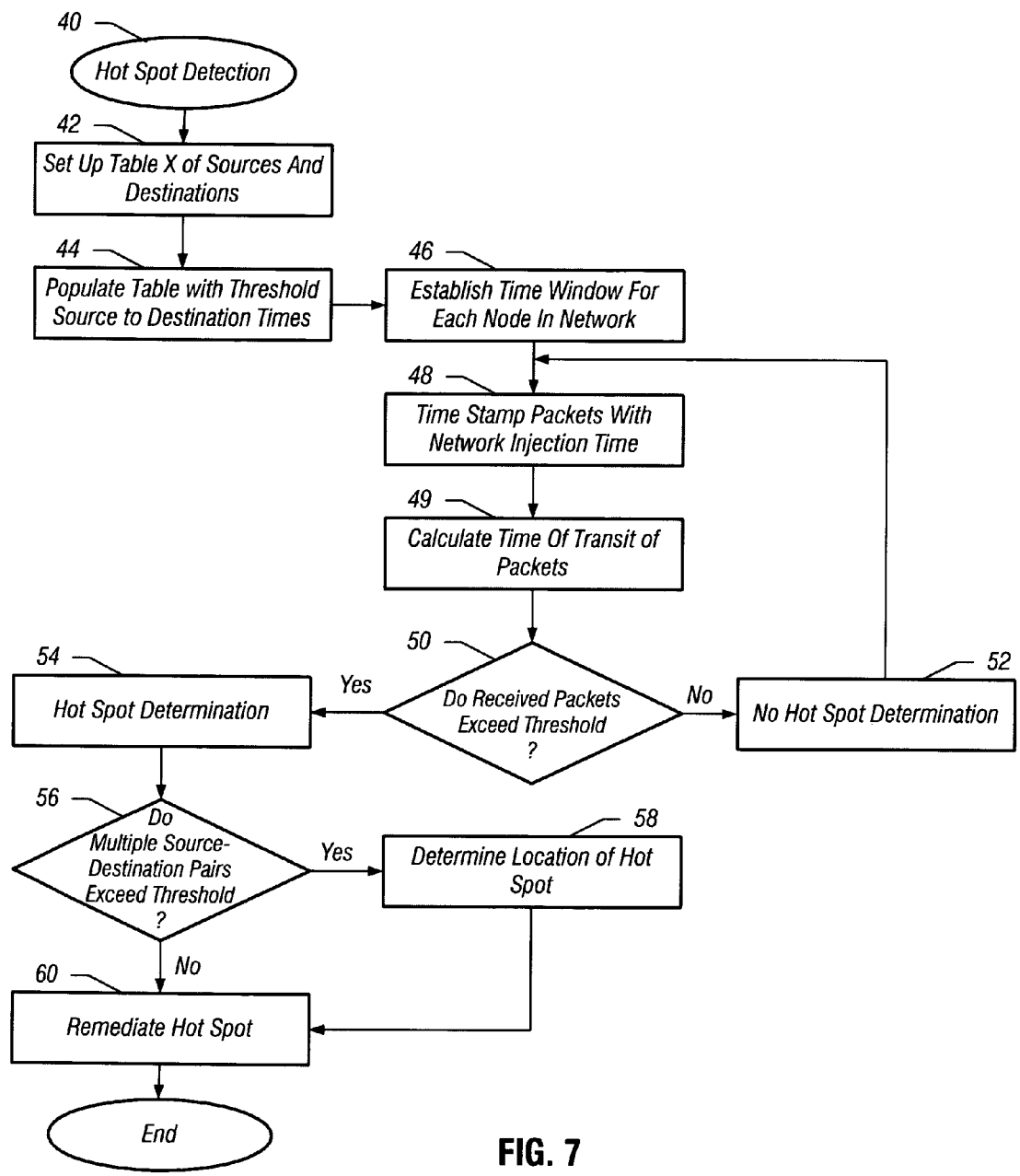
FIG. 7 is a flow chart for hot spot detection in accordance with one embodiment of the present invention.

Thus, referring to FIG. 7, in accordance with one embodiment of the present invention, shown is a flow diagram of a hot spot detection method, such as the hot spot detection software 40, which may be stored on the arbiter 36 of router 20. As shown in FIG. 7, software 40 may begin by setting up a table of sources and destinations within the network (block 42). As an example the network may be the 2D torus of FIG. 5. More specifically, each of a plurality of distributed routers may form a table corresponding to its local view of the network. The table is populated with source-to-destination threshold times for each source/destination pair, as indicated in block 44. These threshold times may be times that would be acceptable for packet transmission in one embodiment. In another embodiment, these threshold times may be times which would be expected under performance criteria of the network. Thus the threshold value is dependent on the network characteristics such as topology and buffering and may be calibrated accordingly. Possible threshold values may be two times or three times the minimum time to transfer a packet from source to destination, as some examples.

Still referring to FIG. 7, next a time window is established for each node in the network (block 46). Such nodes may correspond to the routers, in one embodiment. For example, the time window may correspond to an amount of time during which packets received may be considered by the hot spot algorithm. Thus, over time older packets are no longer considered for the hot spot algorithm, while more recently received packets remain as part of the determination. Accordingly, a sliding window is effected, which filters out old packet information. In different embodiments, the size of the window may vary, for example, depending upon the specific nature of a given network.

At this point, the parameters to be used in performing hot spot detection may thus be set. Accordingly, packet transmission from sources to destinations may be sent with time stamp information. That is, each packet for communication between source and destination may be populated with a time stamp indicating when the packet was injected into the network from the source, as indicated in block 48. In various embodiments, the time stamp information may be inserted into a header of each packet to be transmitted. In addition to time stamping regular packet communications, in certain embodiments test packets also may be inserted into the network to aid in hot spot detection. For example, a hot spot may exist, but certain nodes do not communicate with each other. To fully test the system and to determine presence of one or more hot spots, test packets may be sent between such non-communicating nodes. Like regular communications, these test packets are time stamped to indicate their time of injection at the source node.

Still referring to FIG. 7, when the time of extraction of regular or test packets at the destination node is determined, the time to transit through the network may be determined (block 49). At least two or more time-stamped packets may be sent from at least two sources in order to locate a hot spot. If a packet takes longer than the threshold time (corresponding to the source-destination pair) to arrive at the destination, then it may be concluded that the packet encountered a hot spot along its way. Accordingly it may be determined whether packets received at a destination within the window exceed the threshold (diamond 50). Such a determination may take different forms in different embodiments. For example, in one embodiment a total time for all received packets within the window may be calculated and that sum may be divided by the total number of packets in the window. Then this average transit time may be compared to the threshold for the given source-destination pair. If the transit times are within the threshold, no determination of a hot spot is indicated (block 52). Accordingly, control passes back to block 48. Alternately, if the calculated transit time exceeds the threshold, a hot spot may be indicated (block 54). This threshold comparison process may be performed continually by all routers of a network in a distributed fashion, in various embodiments.

In various embodiments, the threshold analysis and thus hot spot detection may be with respect to packets of multiple source-destination pairs in one or more routers. Where multiple source-destination pairs have slow packets, as determined at diamond 56, such pairs may be used to aid in identifying a location of the hot spot (block 58). In one embodiment, a triangulation method may be used to determine hot spot location based on the multiple source locations and transit time information.

From both diamond 56 and block 58, control may pass to block 60. There, one or more different hot spot remediation techniques may be utilized, as indicated in block 60. For example, the rate of generation of communications from given sources may be throttled. Alternatively, known techniques for routing around the congestion, such as adaptive routing or the like, may be implemented by the router 20. Other techniques for remediating the hot spots may also be utilized.

Embodiments may be implemented in a computer program that may be stored on a storage medium having instructions to program a computer system to perform the embodiments. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

References throughout this specification to "one embodiment" or "an embodiment" mean that a particular feature, structure, or characteristic described in connection with the embodiment is included in at least one implementation. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
receiving time-stamped packets from at least two sources at a destination of a network;
calculating a transit time for each of the time-stamped packets received from the corresponding source at the destination;
determining if the transit time for at least one of the time-stamped packets exceeds a threshold transit time for a source-destination pair associated with the at least one of the time-stamped packets, the threshold transit time stored in a table of a router of the destination, the table including a plurality of entries each including a source-destination pair and a threshold transit time; and
detecting, at the destination, a hot spot and a location of the hot spot in the network remote to the destination and the at least two sources if at least one of the time-stamped packets from the at least two sources exceeds the corresponding threshold transit time, based on the location of the at least two sources and the corresponding transit times.

2. The method of claim 1, further comprising communicating the hot spot detection to other agents of the network.

3. The method of claim 1, further comprising sending test communications from a source to the destination, the test communications including time stamp information.

4. The method of claim 1, further comprising determining, at the destination, the network location of the hot spot based upon the received time-stamped packets from the at least two sources.

5. The method of claim 1, further comprising setting up a table including threshold transit times for source-destination pairs in distributed routers of a plurality of destinations of the network, and determining congestion in the network via at least one of the distributed routers based on time-stamped packets received by the at least one distributed router.

6. An apparatus comprising:
a core to perform instructions; and
a router coupled to the core to receive packets from a plurality of sources of a network and to detect congestion at a location of the network remote to the apparatus via triangulation using transit time information of received packets from at least a first source and a second source, based on the location of the first and second sources and transit times for the received packets, wherein the router includes a table having a plurality of threshold times, each of the plurality of threshold times corresponding to a transit time from a source to the router, and the router is to determine a location of the congestion if at least one of the transit times of the received packets from the at least first and second sources exceeds the corresponding threshold time, based on the location of the at least first and second sources and the corresponding transit times.

7. The apparatus of claim 6, wherein the router is to time stamp outgoing packets.

8. The apparatus of claim 6, wherein the router is to compare the transit time information of a packet from a first source to the router with a threshold time of the table for the first source.

9. The apparatus of claim 6, wherein the apparatus comprises a processor, the processor further comprising a memory controller coupled to the router and to the core, the memory controller to communicate with a memory.

10. The apparatus of claim 9, wherein the router is to couple to a second router of a second processor.

11. A system comprising:
a processor core;
a router coupled to the processor core to determine the transit time of packets received by the router from multiple agents of a network, and to determine if congestion exists at a location remote to the router, wherein the router is to detect the congestion if the transit time of at least one of the packets exceeds a threshold time, and to determine the location of the congestion based upon transit time information of a plurality of packets received from the multiple agents of the network and an intersection of minimum rectangles between an agent including the router and the multiple agents, respectively; and a dynamic random access memory (DRAM) coupled to the processor core.

12. The system of claim 11, wherein the router is to populate a table with threshold agent-to-router transit times.

13. The system of claim 12, wherein the router is to compare the transit time of a first packet received from a first agent to an entry in the table corresponding to the first agent to determine if the threshold agent-to-router transit time was exceeded.

14. The system of claim 11, wherein the router is to time stamp outgoing packets with a network injection time.

15. The system of claim 11, wherein the router is to send test messages to at least one agent with which it does not communicate data packets.

16. The system of claim 11, wherein each of the multiple agents includes a router, each of the routers is to locally detect a global hot spot in the network.

17. The system of claim 16, wherein the routers are to perform the global hot spot detection in a distributed manner.

18. A network comprising:

a first node having a first processor and a first router;

a second node coupled to the first node, the second node having a second processor and a second router, the second router to compare a transit time for a packet received by the second router to a threshold time for a source of the packet; and an interconnect to couple to the first node and the second node, wherein the second router is to detect a hot spot in the network if the transit time for the packet exceeds the threshold time, and to determine a location of the hot spot based upon transit time information of a plurality of packets received from a plurality of nodes of the network and an intersection of minimum rectangles between the second node and the plurality of nodes, respectively.

19. The network of claim 18, wherein the network comprises an interconnection network to connect the plurality of nodes including the first node and the second node.

20. The network of claim 19, wherein the interconnection network comprises a torus.

21. The network of claim 19, wherein the interconnection network comprises a plurality of point-to-point interconnects to couple the plurality of nodes to each other.

22. The network of claim 18, wherein the second router is to communicate the hot spot detection to the first node.

23. The network of claim 22, wherein the first router is to transmit a packet to the second node via a different path upon receipt of the communication.

24. The method of claim 2, further comprising communicating the hot spot detection via a dedicated hot spot indication packet.

25. The method of claim 1, further comprising detecting, at the destination, an imminent hot spot, and informing other agents of the network to route messages to avoid the imminent hot spot.

26. The method of claim 1, further comprising detecting the hot spot location using triangulation.

27. The method of claim 1, further comprising detecting the hot spot location based on the transmit times of a first time-stamped packet from a first source to the destination, the first source and the destination having a first minimum rectangle therebetween, and a second time-stamped packet from a second source to the destination, the second source and the destination having a second minimum rectangle therebetween.

* * * * *

UNITED STATES PATENT AND TRADEMARK OFFICE
CERTIFICATE OF CORRECTION

PATENT NO.         : 7,649,845 B2                                          Page 1 of 1
APPLICATION NO. : 11/241329
DATED              : January 19, 2010
INVENTOR(S)        : Shubhendu S. Mukherjee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1125 days.

Signed and Sealed this

Twenty-eighth Day of December, 2010

David J. Kappos
*Director of the United States Patent and Trademark Office*